(12) United States Patent
George et al.

(10) Patent No.: US 7,379,124 B2
(45) Date of Patent: May 27, 2008

(54) CENTER CONVERGENCE OPTIMIZATION IN A PROJECTION DISPLAY APPARATUS

(75) Inventors: John Barrett George, Carmel, IN (US); Angela Renee Burnett, Indianpaolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 564 days.

(21) Appl. No.: 10/523,449

(22) PCT Filed: Jul. 31, 2003

(86) PCT No.: PCT/US03/24001

§ 371 (c)(1),
(2), (4) Date: Jan. 31, 2005

(87) PCT Pub. No.: WO2004/012438

PCT Pub. Date: Feb. 5, 2004

(65) Prior Publication Data

US 2005/0225684 A1 Oct. 13, 2005

Related U.S. Application Data

(60) Provisional application No. 60/399,865, filed on Jul. 31, 2002.

(51) Int. Cl.
H04N 3/22 (2006.01)
H04N 17/02 (2006.01)

(52) U.S. Cl. ...................................... 348/745; 348/189

(58) Field of Classification Search ........ 348/189–191, 348/806, 807, 511, 745, 747; 315/368.11–370; 353/31, 69
See application file for complete search history.

(56) References Cited

U.S. PATENT DOCUMENTS

| 4,857,998 | A | 8/1989 | Tsujihara et al. |
| 5,159,436 | A | 10/1992 | Soneira |
| 5,510,851 | A * | 4/1996 | Foley et al. ................. 348/658 |
| 5,969,756 | A | 10/1999 | Buckley et al. |
| 6,219,011 | B1 | 4/2001 | Aloni et al. |
| 6,671,004 | B1 * | 12/2003 | Runtze et al. ............... 348/745 |
| 7,061,551 | B2 * | 6/2006 | Shim .......................... 348/745 |
| 2003/0030757 | A1 * | 2/2003 | Shim .......................... 348/745 |
| 2003/0057892 | A1 * | 3/2003 | Lee ........................ 315/368.11 |

OTHER PUBLICATIONS

Search Report Dated Dec. 15, 2003.

* cited by examiner

*Primary Examiner*—Victor R. Kostak
(74) *Attorney, Agent, or Firm*—Joseph J. Laks; Frank Y. Liao; Frank A. Davenport (57) ABSTRACT

Progressive rounding error and convergence error encountered due to multiple use of a center correction adjustment of an image of a video projection display is reduced by calculating a 3×3 matrix for a moved color signal where the non center matrix values represent the difference between the initially measured sensor values stored at initial alignment, and stored most recently measured sensor values. The matrix center value is the sum of the averaged values calculated from the edge center errors, the stored sum of previous moves and the current move. Rerun of the sensor finding routine resets the stored move sum to zero.

20 Claims, 9 Drawing Sheets

CENTER CONVERGENCE OPTIMIZATION IN A PROJECTION DISPLAY APPARATUS

CLAIM FOR PRIORITY

This application claims the benefit, under 35 U.S.C. § 365 of International Application PCT/US03/24001, filed Jul. 31, 2003, which was published in accordance with PCT Article 21(2) on Feb. 5, 2004 in English and which claims the benefit of U.S. provisional patent application No. 60/399,865, filed Jul. 31, 2002.

FIELD OF THE INVENTION

This invention relates to the field of video projection display, and in particular to the correction of minor convergence errors at a projected image center after an automated convergence correction.

BACKGROUND

In a projection video display, geometrical raster distortions result from the physical placement of the cathode ray display tubes. Such raster distortions are exacerbated by the use of cathode ray tubes with curved, concave display surfaces and the inherent magnification in the optical projection path. The projected image is composed of three scanning rasters which are required to be in register one with the other on a viewing screen. The precise overlay of the three projected images requires the adjustment of multiple waveforms to compensate for geometrical distortion and facilitate the superimposition of the three projected images. However, manual alignment of multiple waveforms is labor intensive during manufacturing, and without the use of sophisticated test equipment may preclude setup at a field or user location. Field adjustment is frequently required as a consequence of display relocation which changes the direction and intensity of the Earth's magnetic field incident on the display. Such geomagnetic fields and additional incidental magnetic fields from local magnetized objects introduce some display image rotation but mainly cause a rectilinear movement of the entire picture. Thus an automated convergence system is disclosed which simplifies manufacturing alignment and facilitates field location adjustment. An automated alignment system may employ raster edge measurement at peripheral screen locations in order to determine raster size and convergence. However, errors in the center screen region are not measured, since a center screen sensor is, for obvious reasons, undesirable. In a projection television receiver convergence of the 3 color images may be restored after the instrument has been moved to a different magnetic field using an array of 8 light sensors located around the edges of the picture so as to form a 3×3 matrix. The central sensor is missing. To store convergence, for each of the three colors, the sensors are first located after the initial convergence alignment using the high contrast edges of lighted areas that are fixed in position relative to the picture geometry. The picture is moved via digital convergence deflection. The digital value of said deflection corresponding to an edge location for each color and each sensor is stored in non volatile memory. When the receiver is moved to a new location geomagnetic field changes introduce rectilinear movement of the entire picture and some display image rotation. Because this image displacement is consistent over the whole image an average correction value can be computed for use at the screen center. Convergence is restored by again measuring the sensor locations. For each color a 3×3 difference matrix is calculated using the initial and recent sensor location data. Each color picture is then distorted by applying the 3×3 difference matrix result via parabolic curve fitting to the 15×13 digital convergence correction matrix that covers the same picture area. This process restores the initial relationship of the picture geometry to the sensor positions. Small convergence errors may remain at the screen center. These may be manually corrected by overlaying one color on another using a centered video display of the two colors having high contrast vertical and horizontal edges. A 3×3 difference matrix is then calculated for the color that has been manually moved using 0 error for all locations except the center and the manual movement distance for the center error. For the color where the center was moved the picture is then distorted as described above. Progressive rounding errors and undesired convergence errors occur if this center adjustment is done multiple times without rerunning the sensor finding routine which erases any previous center correcting adjustment.

SUMMARY

In accordance with an inventive arrangement the progressive rounding error and convergence error encountered due to multiple use of a center correction adjustment is eliminated by calculating a 3×3 matrix for the moved color where the non center matrix values are the difference between the initially measured values stored at the initial alignment and the stored most recently measured values. The matrix center value is the sum of the averaged values calculated from the edge center errors, the stored sum of previous moves and the current move. Rerun of the sensor finding routine resets the center move sum to zero.

DETAILED DESCRIPTION

Figure 1A:
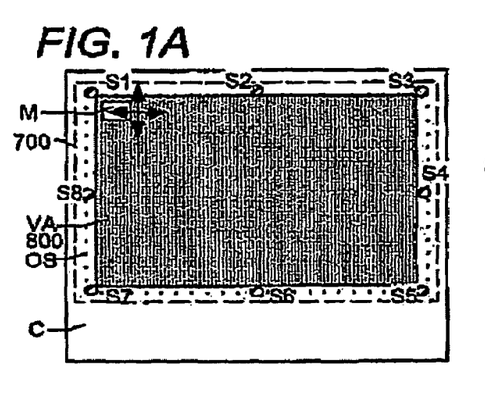
FIG. 1A is a simplified front view of a projection video display.

FIG. 1A illustrates a front view of a video projection display apparatus. The projection display comprises a plurality of cathode ray tubes with raster scanned images which are projected on to screen 700. A cabinet supports and surrounds screen 700 and provides a picture display area 800 which is slightly smaller than the screen. Screen 700 is depicted with a broken line to indicate an edge area which is concealed within cabinet C and which may be illuminated with raster scanned images when operated in an overscan mode as indicated by area OS. Photo sensors are located adjacent to the periphery of screen 700 within the concealed edge area and outside viewed area 800. Eight sensors are shown in FIG. 1A, having positions on a measurement grid, not shown, which provides measurement at the corners and at the centers of the screen edges. Thus with these grid located sensor positions it is possible to measure a correspondingly formatted electronically generated test pattern, for example peak video value block M, to determine picture width and height and certain geometric errors, for example, rotation, bow, trapezium, pincushion etc., and thereby align the displayed images to be superimposed one with the other over the whole of the screen area. Measurements are performed in both horizontal and vertical directions in each of the three projected color images thus yielding at least forty eight measured values.

Figure 1B:
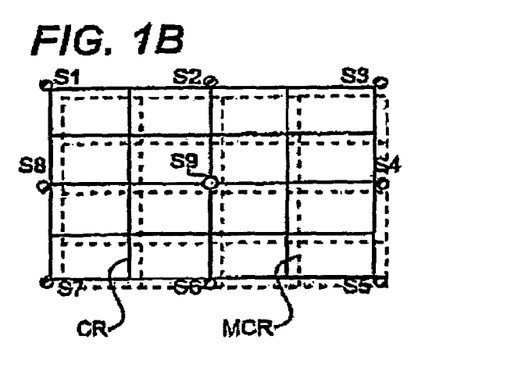
FIG. 1B is a view of a projection video display showing a convergence pattern

Any physical relocation or orientation of the display will produce a translational or rotational picture position error. In FIG. 1B an exemplary test pattern MCR, depicted by the dashed lines is shown displaced from an aligned position as depicted by solid lines CR. The displayed picture shape can be corrected using a 3 by 3 matrix calculation. In FIG. 1B a center screen sensor S9 is depicted to signify an impractical condition where positional data is obtained from this screen location. However, such a center screen position would block normal picture projection hence theoretical sensor S9 cannot be employed as depicted. Thus without a center screen sensor, there is no error information and the center matrix error value is assumed to be zero. This lack of center error information results in the display edges being corrected but with any initial error remaining at the screen center due to the zero matrix value. This lack of a center sensor introduces a requirement for manual touch up adjustment of the center screen convergence of red and blue images to green image. In addition the lack of a center measurement results in some geometric distortion of the green display image because errors in the center are not corrected and can be exacerbated by correction at the edges.

As described previously, following relocation of a magnetically deflected display apparatus the displayed image is subject to movement or unwanted displacement. Such apparatus relocation changes the direction and intensity of the Earth's magnetic field which may introduce some display image rotation but mainly causes rectilinear movement of the entire picture. Image displacement is consistent over the whole display image area. Thus, average correction values can be computed for use as a center screen value in the correction matrix.

The theoretical center screen sensor S9 shown in FIG. 1B is clearly impractical and cannot be employed, however, positional data for this location is advantageously derived by interpolation. A center screen horizontal value is calculated from an average of the horizontal correction values determined by sensors S2 and S6, which are located respectively at the center of the screen top edge, and the center of the screen bottom edge. A center vertical value is calculated in a similar manner from an average of the vertical correction values determined by sensor S8, located at the center left screen edge, and sensor S4 located at the center right screen edge.

When the 3×3 matrix calculation is performed with the center error defined in this way, all central rectilinear movement error and rotational error in all three colors is substantially eliminated, and in addition geometric errors in the green image are significantly reduced. Furthermore, center convergence errors of red and blue relative to green are minimized such that only a minor perfecting manual adjustment may be needed.

Center Offset Determination for an eight sensor automatic alignment system is performed as follows. Measurements of the horizontal and vertical offsets from nominal sensor positions are performed, with an interpolation algorithm applied to the convergence values to compensate for raster shifts and rotation due to the influence of geomagnetic magnetic fields. The use of sensors at the screen periphery permit measurement of the display image at the screen edge. Thus horizontal and vertical offsets, or placement errors from nominal sensor locations are measured at sensors S1-S8 for each color (red, green and blue). However, since there is no sensor S9, for the center position, an approximation for the missing center offset is advantageously derived by averaging the measured, co-linear horizontal and vertical offsets. An average horizontal center offset (Have) is derived from offset values measured at sensor positions S2 and S6, where $S9(\text{Have}) = (S2\text{val} + S6\text{val})/2$.

Figure 3:
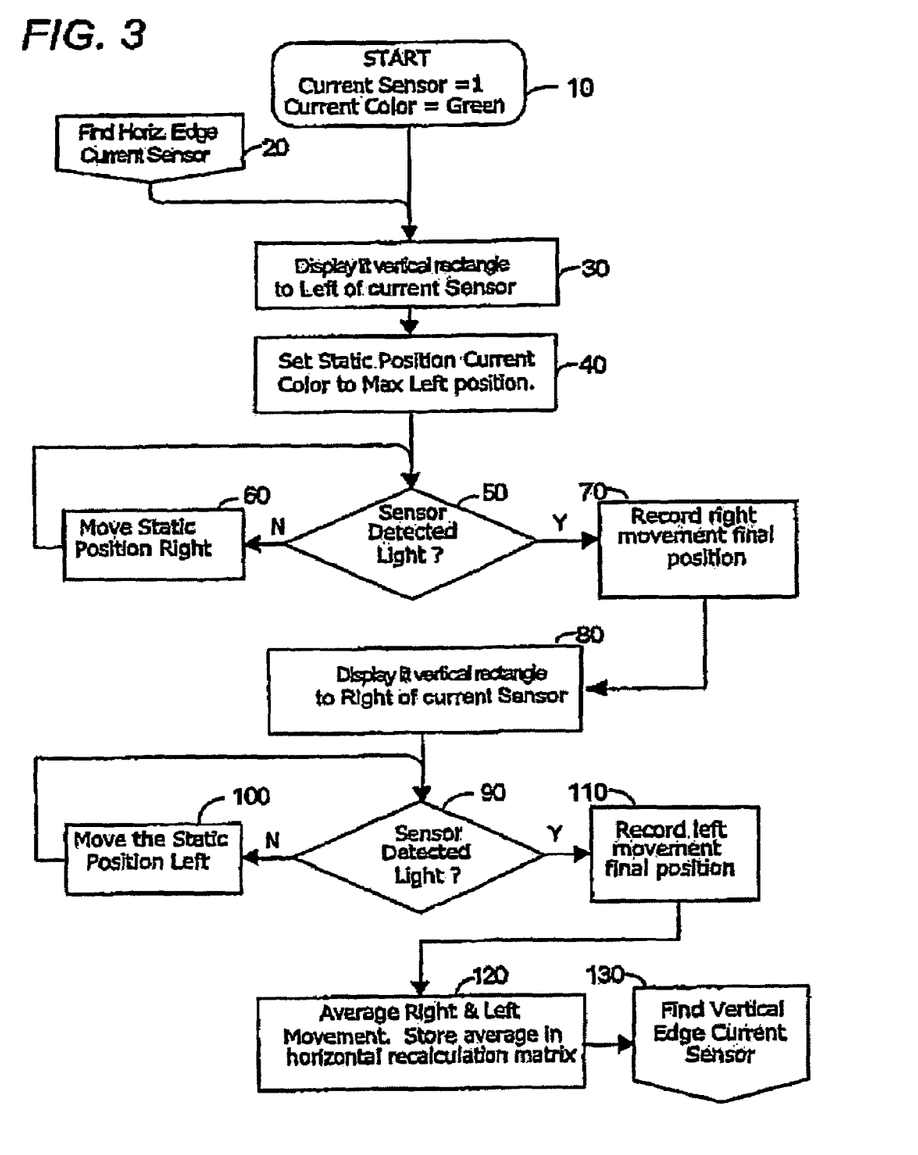
FIGS. 3, 4 and 5 are flow charts showing automated edge and error detection sequences.
Figure 4:
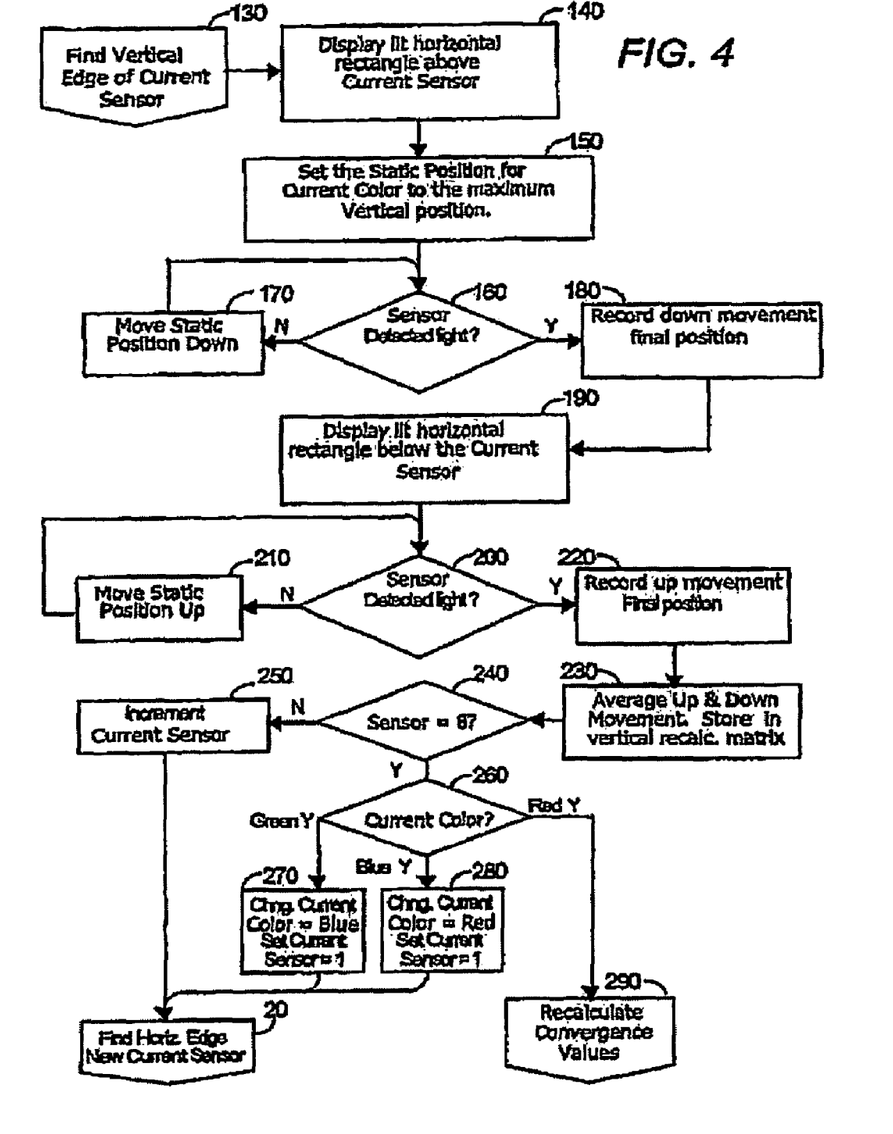
Figure 5:
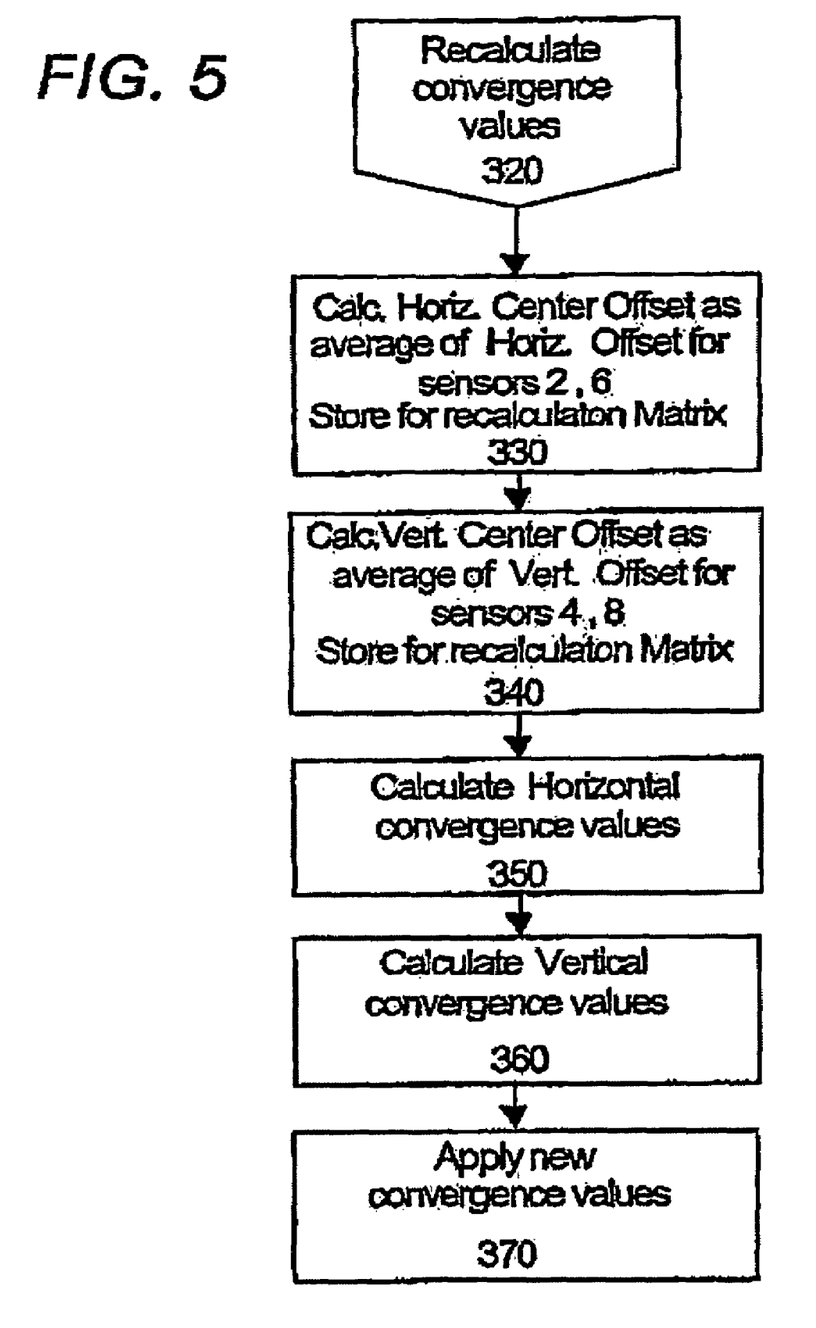

As a consequence CRT positions within the apparatus, geomagnetic related shift is substantially rectilinear, hence this average center value provides a reasonable approximation for a horizontal center offset. In the same way an average vertical offset value (Vave) is derived from sensors S4 and S8, where $S9(\text{Vave}) = (S4\text{val} + S8\text{val})/2$, which provides a reasonable approximation of the vertical center offset. The use of average center values ensures that in cases of raster shifts, noticeable geometrical distortion is substantially eliminated and manual touch up adjustment after auto convergence is largely obviated. A high-level flow chart of the offset (edge) detection process is shown in FIGS. 3, 4 and 5.

Figure 2:
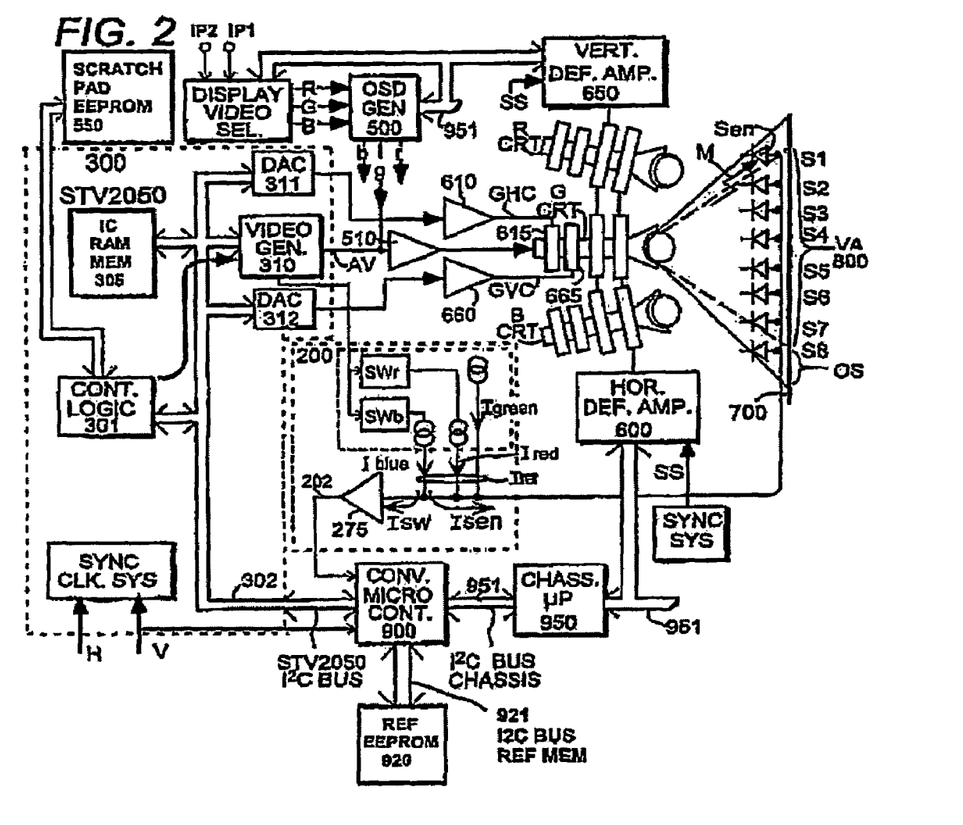
FIG. 2 is a simplified block diagram of a video image projection display apparatus including advantageous features.

Operation of the measurement and alignment system will be explained with reference to FIG. 2 which depicts in block diagram form, part of a raster scanned video projection display. In FIG. 2 three cathode ray tubes, R, G and B form raster scanned monochromatic color images which are directed through individual lens systems to converge and form a single display image 800 on screen 700. Each cathode ray tube is depicted with four coil sets which provide horizontal and vertical deflection and horizontal and vertical convergence. The horizontal deflection coil sets are driven by a horizontal deflection amplifier 600 and vertical deflection coil sets are driven by a vertical deflection amplifier 650. Exemplary green channel horizontal convergence coil 615 receives drive from deflection amplifier 610 and digital to analog converter 311. Green vertical deflection coil 665 receives drive from deflection amplifier 660 and digital to analog converter 312. Deflection waveform signals from digital to analog converters 312 and 311 are controlled in amplitude and waveshape by data stored in IC RAM memory 305. Appropriate data is selected from either scratch pad electronically erasable read only memory (EEPROM) 550 via control logic 301 or selected via data bus 302 and convergence micro controller 900 from reference EEPROM 920. The correction waveform signals GHC and GVC may be considered representative of DC and AC convergence signals, for example static and dynamic convergence. However, these functional attributes may be facilitated, for example by modifying all measurement location addresses by the same value or offset to move the complete raster and achieve an apparent static convergence or centering effect. Similarly, a dynamic convergence effect may be produced by modification of the location address of a specific measurement location.

An input display signal selector selects, by means of bus 951, between two signal sources IP1 and IP2, for example an analog broadcast or video signal using the NTSC (National Television Systems committee) format and a digital broadcast or video signal using an ATSC (Advanced Television Systems Committee) format. Video display signals RGB, are derived from the display video selector and electronically generated message information, for example user control information, display setup and alignment signals and messages generated responsive to commands from controllers 301, 900 and 950 coupled via buses 302 and 951, may be combined by on screen display generator 500. During automated sensitivity calibration or convergence alignment, controller 900 sends commands via a data bus 302 to controller 301 which instructs video generator 310 to generate an exemplary green channel calibration video test signal AV comprising an exemplary black level signal with a rectangular block M having a predetermined video amplitude value. Controllers 900 and 301 also position block M to illuminate exemplary sensor S1 by determining horizontal and vertical timing to position block M within the scanned display raster or by moving the scanned raster, or a part of the scanned raster containing the marker block M. Green channel test signal AV is output from IC 300 and combined at amplifier 510, with the green channel output signal from on screen display generator 500. Thus, the output signal from amplifier 510 is coupled to exemplary green cathode ray tube GCRT, and may include display source video and or OSD generated signals and or IC 300 generated calibration video test signals AV.

To correct color dependent sensor sensitivity, switches SWr and SWb responsive to red or blue drive output from video generator 310 add either Ired or Iblue to Igreen to make reference current Iref that is compared to light dependent current Isen from sensors S1-S8 by sensor detector 275.

$$Isw=Iref-Isen$$

When Isen exceeds Iref, Isw becomes negative indicating light is detected.

Controller 301 executes a program stored in convergence micro controller 900 which comprises various algorithms. To facilitate adjustment and alignment of the three color images, setup block M is generated as described previously and coupled to exemplary green CRT. In FIG. 1 test pattern, block M is shown approaching sensor S1, and as previously mentioned each sensor may be illuminated by the timed generation of the marker block within a video signal projected with an overscanned raster, or by positioning the scanned raster such that marker block M lights sensor S1. With certain display signal inputs, for example ATSC digital format signals, substantially all of the scanned area can be utilized for signal display thus operation with an overscanned raster is largely precluded. Hence under this substantially zero overscan condition exemplary sensor S1 may be illuminated by raster positioning of block M or by temporary expansion of the picture size. Clearly, individual sensor illumination may be facilitated with a combination of both video signal timing, raster positioning and raster size change.

With reference to FIG. 2, video generator 310 is instructed by control logic 301 to generate an exemplary green video block M having an initial non-peak video value and positioned on a substantially black or near black level background. Similar video blocks with non-peak video values may be generated in each color channel, which if generated simultaneously and superimposed at the screen would produce an aligned white image block on a substantially black background. Thus, an exemplary green block M is generated by video generator 310 and coupled via amplifier 510 to the green CRT. The video generator 310 is controlled by the micro controller 301 to generate the green block M at a horizontal and vertical screen position such that a specific sensor, for example, sensor S1, is illuminated by green light from block M. Illumination of the sensor results in a photo generated current Isen, as shown in FIG. 2.

Widely differing photo generated sensor currents are advantageously compensated, calibrated and measured by means of adjustment of the drive from generator 310. Sensor detector 275 is depicted in circuit block 200 of FIG. 2. In simple terms a reference current Iref is generated in accordance with the color lit by video generator 310. A basic reference current Igreen is always present. Green excitation of the sensors produces the least sensor photo current Isen. For red or blue switches SWr or SWb detect the color output of video generator 310 and add additional current Ired or Iblue to equalize the detector sensitivity. The sensor current Isen is subtracted from the reference current Iref to yield a detector 275 current Isw. When Isw becomes negative, indicating light related current Isen is greater than the reference current Iref detector 275 sends a light present logic signal to convergence micro controller 900. Video generator 310 may for example have 15 levels of drive. Under control of controllers 900 and 301, for each color, starting with a low level of 310 drive and increasing step by step the light level increases until light can be seen at each sensor location. The drive for each color is then fixed for the color. In the absence of sensor illumination, sensor S1, represents a high impedance and consequently diverts an insignificant current, Isen, from reference current Iref. Thus the majority of reference current Iref, is coupled to sensor detector 275 as current Isw. Current Isw biases detector 275 such that the output state is low, which is chosen to represent an unlit or unilluminated sensor. When sensor S1 is illuminated, photo generated charge causes the sensor to present a lower impedance and shunt a greater current Isen, from reference current Iref, thus diverting current Isw from sensor detector 275. At a particular illumination level, sensor S1 diverts sufficient current from sensor detector 275 to cause it to switch off and assume a high, nominally supply voltage potential, which is chosen to be indicative of a lit or illuminated sensor. The output from sensor detector 275 is a positive going pulse signal 202 which is coupled to an input of convergence micro controller 900. Scanning of the picture raster will cause a light pulse signal once each vertical deflection period at a sensor that is illuminated. Vertical sync signal V provides a timing reference at the start of each vertical period to convergence micro controller 900. The presence of light during a vertical period causes the controller 900 to tally a light seen record and to advance the position of the lighted area. Two vertical periods of darkness will cause a light not seen tally record and advance the lighted area position. A maximum of two vertical periods are required to properly light detect an interlaced raster. Advancing the lighted area position immediately after light is seen saves time in the sampling process since light may be sometimes be seen in the first vertical period and the second vertical period can be eliminated.

FIG. 3 is a flow chart illustrating an exemplary sequence for determining a horizontal raster position relative to a fixed photo sensor. The sequence is initiated at step 10 where sensor 1 is selected as the current sensor and the green channel as the current channel. Step 20 requests determination of a marker horizontal edge by the current sensor in the current channel. A marker or vertical rectangle is generated and projected at step 30 to illuminate an area to the left of the current sensor. At step 40 the static position, for example H shift, for the current color, green is set to the maximum left position and at step 50 the photo sensor is tested to determine the presence or absence of illumination by the marker rectangle. A NO at step 50 initiates, at step 60, a move or change in the static position to the right which is again tested at step 50. This progressive rightward movement looping sequence continues until step 50 tests YES whereupon the value or movement position which resulted in sensor illumination is recorded or stored at step 70.

The preceding sequence is repeated for a marker rectangle approaching the sensor from the right side. Step 80 displays the marker illumination to the right side of the sensor and the sensor is tested at step 90 to determine illumination by the marker. A NO at step 90 initiates, at step 100, a move or change in the static position in the left direction which is again tested at step 80. The loop formed by steps 90 and 100 continues until the sensor is lit and step 90 tests YES which in turn results in step 110 recording the movement value that caused sensor detection. The stored or recorded left and right movement values which caused sensor detection are processed to form an average horizontal value at step 120 which is used in the correction matrix. Following this sequence of horizontal position measurements a similar sequence is performed in the vertical raster direction and is initiated at step 130.

The marker rectangle is generated and positioned above the current sensor at step 140. The static vertical position for the current color is set to a maximum value at step 150 and the sensor is tested at step 160 for illumination by the marker. A NO at step 160 results in the static position of the marker being moved downward by step 170, re-tested at step 160 and continuing downward movement until step 160 tests YES. A YES at step 160 causes the movement value that resulted in sensor detection to be recorded or stored at step 180. The marker is then repositioned below the current sensor at step 190 and is marker position is then tested at step 200 for sensor illumination by the marker. A NO at step 200 results in the marker being moved in an upward direction at step 210 and retested at step 200. This movement loop continues until the sensor is illuminated by the marker and step 200 indicates YES causing the movement value to be stored or recorded at step 220. The two stored vertical movement values which caused sensor detection are averaged to form a vertical value at step 230 and stored for use in the 3×3 convergence correction matrix. The movement pattern may be linear as illustrated here for simplicity, or may take another form, such as the well known binary search, for improved searching speed.

At step 240 a test is performed to determine if all 8 sensor positions have been measured, where a NO increments the current sensor number by one count at step 250, and initiates determination of a horizontal edge by returning to step 20. Thus the sequence formed by steps 10-250 measures raster placement errors in both horizontal and vertical raster scan directions for each sensor position with an average error value calculated and stored. Hence when step 240 tests YES all sensor positions have been measured, averaged and stored. The YES at test 240 causes a further test to be performed at step 260 which determines in which color the completed measurement sequence was performed. Since step 10 initiated the measurement sequence in the green channel, test 260 will indicate GREEN YES which in turn, at step 270, changes the current channel to BLUE and sets the current sensor to 1. Following step 270 the sequence returns to step 20 to determine a horizontal edge in the blue channel. As described previously the sequence of steps 10-250 cause each sensor position to be measured with an average value established, and stored, for raster placement errors in both horizontal and vertical raster scan directions. When step 240 tests YES all sensor positions have been measured, averaged and stored and step 260 determines which color has been measured. Since step 270 changed the CURRENT color to BLUE, step 260 will indicate BLUE YES which in turn at step 280, changes the current channel to RED and sets the current sensor to 1. The sequence then returns to step 20 for horizontal edge determination in the red channel. As described previously steps 10-250 are performed 16 times to measure and store positional errors for all sensor positions in both horizontal and vertical directions. Finally when step 260 tests RED YES, all 8 sensors have been measured in both horizontal and vertical directions for all three colors yielding 48 stored average raster placement error values.

These stored error values are applied to the 3×3 convergence recalculation matrix described previously and illustrated in the sequence shown in FIG. 5. Step 320 initiates convergence recalculation with step 330 advantageously forming an average horizontal offset error for the absent center screen sensor S9. This average horizontal center offset (Have) is derived, as has been described, by averaging the stored, averaged offset values measured at steps 120 and 230 for sensor positions S2 and S6 in each color, where $S9(\text{Have})=(S2\text{val}+S6\text{val})/2$.

These average horizontal center offset values are then stored for subsequent use. This advantageous process is repeated at step 340 to establish a center average vertical offset error value (Vave) from averaged position errors values for sensors S4 and S8, where $S9(\text{Vave})=(S4\text{val}+S8\text{val})/2$.

These calculated average center screen values are stored for subsequent use in a curve fitting calculation to determine horizontal and vertical convergence waveform values at steps 350 and 360 respectively. At step 370 new convergence signals, needed to restore a converged picture are added to the current values and applied to horizontal and vertical convergence coils for example exemplary green coils 615 and 665.

The objective of the curve fitting calculation performed in steps 350 and 360 is to generate waveforms which pass through the measured and calculated co-linear horizontal and vertical offset values. The addition of the curves to the existing convergence values will then restore the picture to a converged condition. Such curve fitting calculations are known but will now be described in simplified terms.

As mentioned with respect to FIG. 1B, sensors S1-S8 may be located on an exemplary grid with coordinates as shown in exemplary TABLE I for the overscanned raster case. The origin is in the upper left corner and positive is in the direction of the scan, right and down. The viewable picture area is a rectangle inside a border line: 1.5, 0.5; 14.5, 0.5; 14.5, 11.5 and 1.5, 11.5. This coordinate system is used for mapping the 3×3 matrix of the sensor locations on to a 15×13 matrix of the convergence adjustment locations comprising columns 1-15 and rows 0-12. Column 0 occurs during the horizontal retrace time of raster scanning and contains a duplicate of the column 1 data. If the picture is underscanned and must be temporarily expanded in size in order to light the sensors during auto alignment the 15×13 matrix will expand and the 3×3 matrix must be mapped smaller on the 15×13 matrix.

TABLE I

| Sensor # | H coordinate | V coordinate |
| --- | --- | --- |
| 1 | 1.25 | 0.25 |
| 2 | 8 | 0.25 |
| 3 | 14.75 | 0.25 |
| 4 | 14.75 | 6 |
| 5 | 14.75 | 11.75 |
| 6 | 8 | 11.75 |
| 7 | 1.25 | 11.75 |
| 8 | 1.25 | 6 |

In the initial convergence alignment a grid is lit corresponding to the 15×13 matrix lines and the picture edge border line. A camera and computer system is used to adjust this grid to correct geometric distortion and fit the border line within the frame of the screen. The actual locations of the sensors are then measured relative to the 15×13 grid in terms of minimum convergence adjustment step size increments. This stored measurement of the actual raster positions provides a basis to later evaluate movement of the raster with respect to the sensors. When a relative movement has been measured, a 3×3 difference matrix can be calculated and using parabolic curve fitting the 3×3 matrix can be mapped to the 15×13 matrix so that new convergence values for all points in the 15×13 matrix are determined that will restore the 15×13 grid to its original location within the screen frame. This differential approach allows the mechanical sensor locations to be non critical. As previously mentioned, the center data or $9^{th}$ sensor data is missing and must be estimated. This is done using simple linear interpolation average from the center of top and bottom sensor location data for horizontal movement and the center of left and right side sensor location data for vertical movement.

Figure 6A:
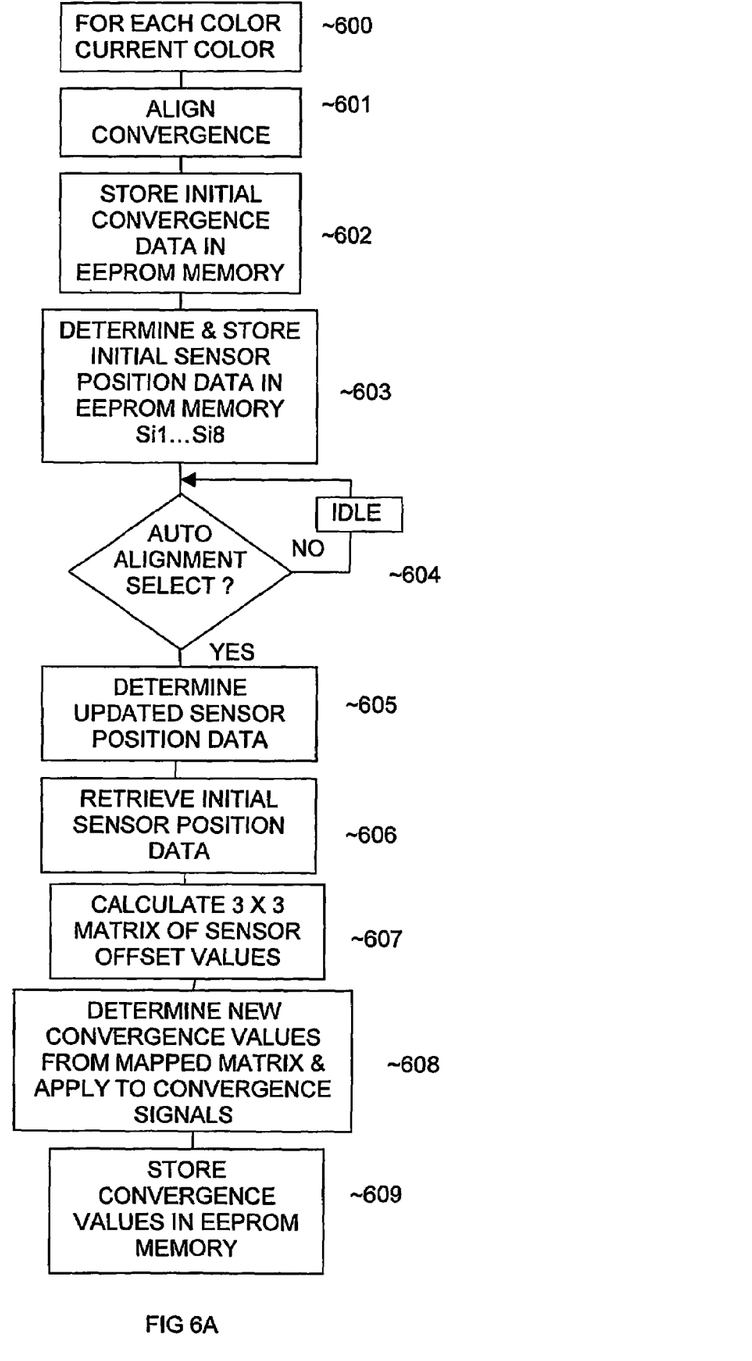
FIG. 6A is a flow chart showing a present art automatic alignment process.

Using the process described above the convergence may be restored to acceptable accuracy after a change in the magnetic field alters the deflection in the three cathode ray tubes. The process for this automatic alignment is shown in summary form in FIG. 6A (steps 601-609) and repeated with additional storage steps to facilitate the present invention in FIG. 7A.

The scratch pad EEPROM 550 is nonvolatile storage used to restore lost RAM 305 data after a power down cycle. The EEPROM 920 is nonvolatile storage for initial convergence alignment data (steps 601, 602) and initial sensor position data (step 603). The convergence IC DACs, for example 311 and 312 always use RAM 305 data. At power up this RAM data is loaded from scratch pad EEPROM 550. At the start of the automatic alignment process (step 604) the EEPROM 920 initial alignment data is loaded into RAM 305. This must be done to reestablish the initial conditions that were measured to be a correct convergence alignment. The sensor positions corresponding to this initial alignment data are known and are stored in reference EEPROM 920. The sensor finding process (step 605) described above in FIGS. 3, 4 and 5 allows the picture distortion caused by the change in magnetic field or by any other cause to be measured as a difference in sensor positions (step 607) using alignment data (step 606) that once produced a correct convergence result. The three color pictures can then be separately custom distorted via the matrix process described above such that the sensor positions are restored to a desired location with respect to the picture geometry. This action restores the original desired convergence (step 608). The new convergence data resulting form the matrix calculations is stored (step 609) in IC RAM 305 and backed up in scratch pad EEPROM 550.

Figure 6B:
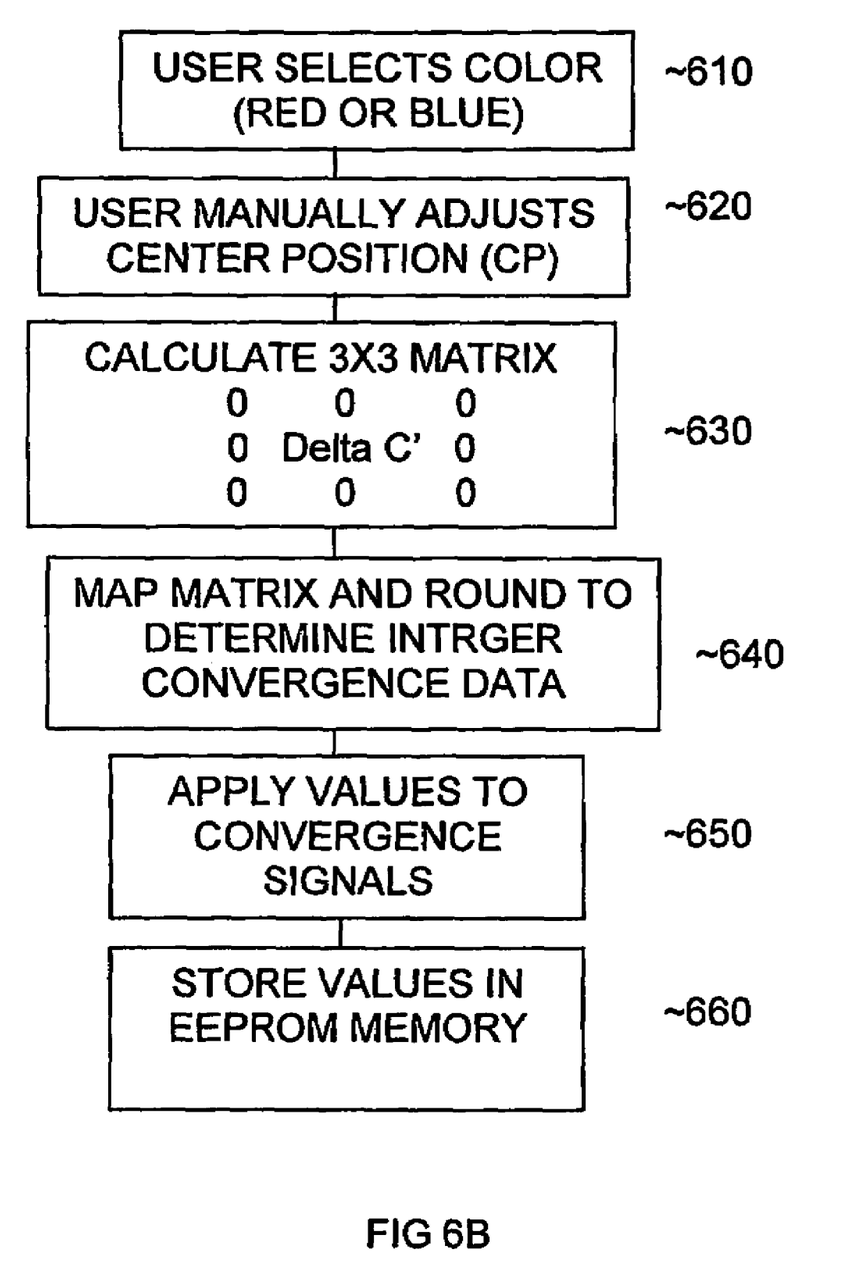
FIG. 6B is a flow chart showing a present art manual center adjustment sequence.

FIG. 6B shows a current manual center convergence optimization process. In this process a selected color (step 610), either red or blue, is manually adjusted (step 620) by the user to converge with green utilizing a two color display at the screen center. The distance (CP) that the selected color moves is measured in terms of digital convergence digital steps. This step count is used as the center value (Delta C') in a 3×3 matrix (step 630). The other 8 matrix values are zero. When convergence values are calculated (step 640) and applied (step 650), this matrix will modify the center of the picture and leave the edges unchanged. The matrix calculation result includes many fractions that must be rounded to integers for digital storage in RAM 305 and EEPROM 550 (step 660). For one or two moves this is acceptable. If multiple moves are done, the rounding errors accumulate and cause undesired convergence errors.

Figure 7A:
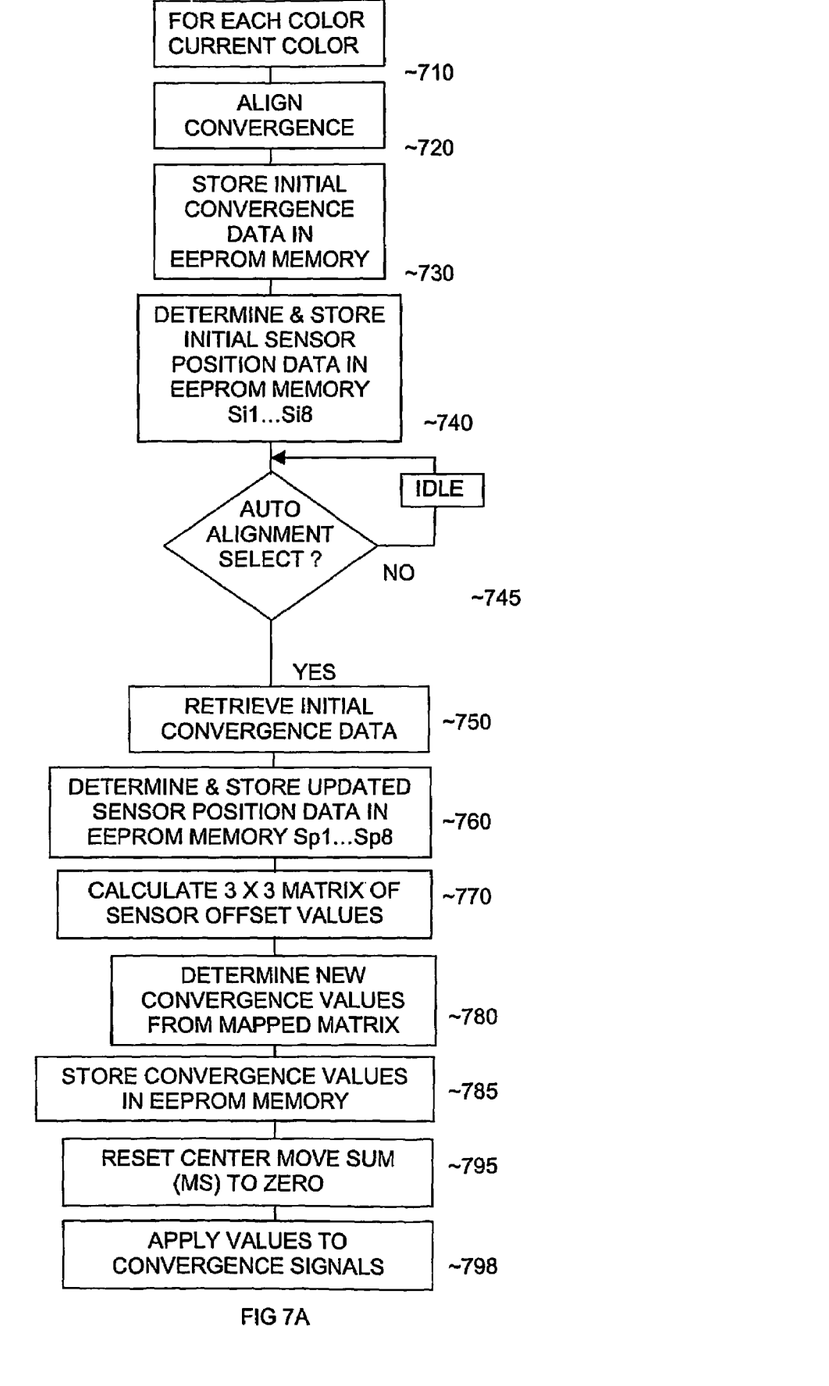
FIG. 7A is a flow chart showing data storage modifications to the automatic alignment process to implement center convergence optimization according to an embodiment of the present invention.
Figure 7B:
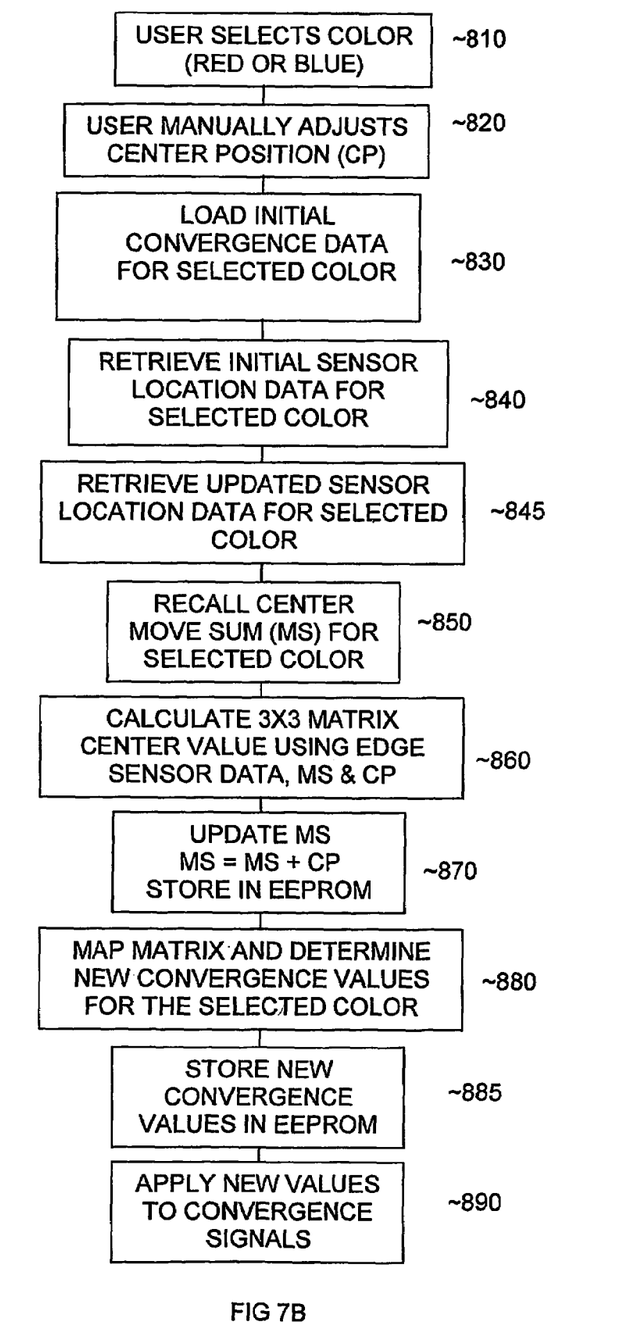
FIG. 7B is a flow chart showing a center adjustment sequence according to an embodiment of the present invention that eliminates accumulating errors with multiple moves of the center.

According to an aspect of the present invention, an exemplary operation is illustrated for reducing/eliminating the accumulation of rounding errors with multiple manual centering moves. The exemplary process is shown in FIGS. 7A and 7B. In FIG. 7A the storage in reference EEPROM 920 is increased to include sensor position data from the latest auto alignment and data to show a sum of previous centering moves (MS). Running auto converge cancels previous manual centering adjustments so the move sum (MS) is set to zero.

More particularly, referring to FIG. 7A in conjunction with FIG. 2, an alignment process 700 is performed for each color band (step 710) e.g. red, blue, green, wherein an initial convergence alignment (step 720) is performed and initial convergence data is stored in memory (step 730) such as RAM 305 (FIG. 2) and EEPROM 920 (FIG. 2). Each of the edge sensor locations or positions are determined and the initial sensor location data (Si1, . . . , Si8) are stored in memory (step 740) such as EEPROM 920 (FIG. 2). In response to user selection (step 745) the system operates to perform an automatic alignment process which includes recalling the initial convergence data (step 750) to RAM 305 from EEPROM 920 and determining new (i.e. updated) actual sensor location data (Sp1, . . . , Sp8) for storing in EEPROM 920 (step 760). The updated sensor location data stored in EEPROM 920 memory allows for future recalculation of offsets or differences based on the most recently calculated autoconvergence data. A 3×3 matrix of sensor offset values is obtained from the differences between the initial sensor location data (Si1, . . . Si8) and new or updated sensor location data (Sp1, . . . , Sp8) (step 770). The initial center sensor location is calculated to be the initial vertical average of the edge center, left and right and the initial horizontal average of the edge center, top and bottom. In a similar fashion the updated center sensor location is calculated to be the updated vertical average of the edge center, left and right and the updated horizontal average of the edge center, top and bottom. The center location matrix value (DC) is the difference between the initial and updated center locations. The 3×3 matrix takes the following form:

| Si1 − Sp1 | Si2 − Sp2 | Si3 − Sp3 |
| Si8 − Sp8 | DC | Si4 − Sp4 |
| Si7 − Sp7 | Si6 − Sp6 | Si5 − Sp5 | where $DC = H_{average} = (Si2h + Si6h)/2 - (Sp2h + Sp6h)/2$ $V_{average} = (Si8v + Si4v)/2 - (Sp8v + Sp4v)/2$ The 3×3 matrix is then mapped onto the 15×13 convergence grid display to obtain convergence values based on the matrix results (step 780). These values are calculated for each grid crossing and are rounded to integers and stored in memory (step 785) such as IC RAM 305 (FIG. 2) and EEPROM 550. A move sum variable (MS) representative of the sum of each of the center moves is set to zero and stored in memory (step 795) such as EEPROM 920 (FIG. 2). Convergence values are then used to drive waveform generators DAC 311, 312 (FIG. 2) as indicated in step 798.

FIG. 7B shows the new manual centering process according to an aspect of the present invention. After a color is selected to be moved (step 810), the user moves the color to correctly overlap green at the picture center using a two color display (step 820). This action is done using EEPROM 550 data copied to RAM 305 that may include center distortion from previous moves. This distortion will determine the distance and direction of movement required to optimize convergence. The "move sum" (MS) in EEROM 920 stores the center offset that was used to calculate the current EEPROM 550/RAM 305 data from the initial alignment data When the user has completed the move, initial alignment data (steps 830, 840, 850) for the selected color is loaded to RAM 305 from EEPROM 920 to facilitate the matrix calculation. The 8 edge points in the matrix are defined as the difference between the initial sensor positions and the sensor positions from the most recent auto alignment. The center matrix point is the average of the left and right sensor vertical difference and the top and bottom sensor horizontal difference plus (+) the "move sum" (MS) of previous moves plus (+) the present move (CP). If no moves have occurred since the last auto converge and the present move is zero, this matrix is exactly like the one used to recalculate the selected color during the last auto converge. If a move has occurred or is occurring, the matrix will be like the last auto converge of the selected color with the center moved. All of the data used to calculate the matrix is either initial integer data or integer move data. There is no rounded fraction accumulation from previous moves.

More particularly, as shown in FIG. 7B the user is permitted to further adjust the image to optimize the convergence process and further correct for undesired distortion. The user is provided with a menu display (not shown) which allows optimization of the center position area convergence for two of the three color bands. A color is selected for centering (step 810) which, in an exemplary embodiment, is either red or blue (relative to green). A yellow (red plus green) or cyan (blue plus green) centering signal is then displayed on the screen. The user moves either the red or blue color signal marker to align the overlap of the colors and then exits the adjustment screen (step 820). For the color that has been moved, initial convergence data is loaded from EEPROM 920 memory to IC RAM 305 (step 830). In addition, initial sensor location data (Si1, ..., Si8), present sensor location data (Sp1, ..., Sp8), and the center move sum value (MS) are retrieved from memory (steps 840, 845, 850, respectively). For the moved color, a 3×3 matrix is calculated (step 860) using the same matrix calculation values as the most recent auto convergence calculation except for the center position. The 3×3 matrix takes the following form:

| Si1 − Sp1 | Si2 − Sp2 | Si3 − Sp3 |
| Si8 − Sp8 | DC″ | Si4 − Sp4 |
| Si7 − Sp7 | Si6 − Sp6 | Si5 − Sp5 | where $DC''=DC+MS+CP$

The center value represents the current distance the color was moved (CP) plus the most recent auto convergence value (DC) plus the center move history sum value (MS). The move history sum value (MS) is updated (step 870) by summing the present move (CP) with the prior move history sum value (MS) and is stored in EEPROM 920.

The 3×3 matrix (step 860) is then mapped onto the 15×13 convergence grid display to obtain convergence values based on the matrix results (step 880). These values are calculated for each grid crossing and are rounded to integers and stored in memory (step 885) such as IC RAM 305 (FIG. 2) and EEPROM 550. A move sum variable (MS) representative of the sum of each of the center moves is set to zero and stored in memory (step 795) such as EEPROM 920 (FIG. 2). Convergence values are then used to drive waveform generators DAC 311, 312 (FIG. 2) as indicated in step 890, for optimizing center convergence. Thus, as previously discussed, rounding errors do not accumulate as the data used to calculate the matrix is either initial integer data or integer move data.

Further, according to an aspect of the invention, the above described system and process enables convergence values associated with each of the color bands to be optimized regardless of the number of moves and/or manual/user realignments of the center position such that for any number of image centering operations, a worst case change to a difference between a center of one of the color bands forming an image on the display screen and a center of one of the other color bands is less than one half of a millimeter.

While aspects of the present invention have been described in the context of a video display system, it is understood that the processes according to the invention are capable of being embodied and distributed in the form of a computer readable medium of instructions for execution by a processor of the video display system for controlling the processor to perform the method of center convergence optimization. The invention applies equally to a variety of forms of computer readable media, regardless of the particular type of signal bearing media actually used to carry out the distribution and regardless of the nature of the programming instructions, factors or other specific programming techniques. Examples of computer readable media include recordable-type media, such as a floppy disk, hard disk drive, RAM, ROM, CD-ROM, DVD-ROM, and transmission-type media, such as digital and analog communications links, wired or wireless communications links using transmission forms, such as, for example, radio frequency and light wave transmissions. The computer readable media may take the form of coded formats that are executable as well as formats that are interpreted or decoded for actual use in a particular data processing system.

Although the invention has been described and pictured in exemplary forms with a certain degree of particularity, it is understood that the present disclosure of such forms is made by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A video display apparatus, comprising:
   a controllable source of a plurality of beams for producing an image on a display screen;
   a photo sensor responsive to a light produced by said image for generating a light sensing output signal;

a source of a centering signal; and a processor responsive to said fight sensing output signal for performing, when selected, an automatic image distortion correction operation to store a first plurality of correction values in a memory, said processor being further responsive to said centering signal and to correction values stored in said memory for producing a second plurality of correction values that are applied to said controllable source of said plurality of beams to provide an image centering change of said image, in accordance with said centering signal, such that, for any possible sequence of image centering operations, a worst case change to a difference between a center of one of a plurality of color bands forming an image on said display screen and a center of one of the other color bands is less than one half of a millimeter.

2. The display apparatus of claim 1, wherein said first plurality of correction values comprises data derived from initial sensor location data and updated sensor location data.

3. The display apparatus of claim 1, wherein said second plurality of correction values comprises data derived from values associated with calculated edge center errors, a current movement variable associated with a current center movement, and a history of prior moves from a center position.

4. The display apparatus of claim 3, wherein said second plurality of correction values comprises integer information.

5. The display apparatus of claim 1, wherein said imaging centering change occurs in response to a user adjustment of positional imaging information.

6. The display apparatus of claim 1, wherein said first plurality of correction values are derived from a matrix calculation of sensor offset values indicative of differences between initial sensor position data and updated sensor position data.

7. The display apparatus of claim 1, wherein said second plurality of correction values are derived from a 3×3 matrix calculation based on said first correction values and an updated center positional value taking into account prior center position offsets.

8. The display apparatus of claim 1, wherein said first plurality and second plurality of correction values are integers, said first plurality and second plurality being derived, respectively, from a first set and second set of 3×3 matrix calculations of convergence data, and wherein said first set and second set of matrix calculations utilize the same values except for a center matrix value, corresponding to a center offset associated with a center position of the display screen.

9. The display apparatus of claim 8, wherein said center value of said second set of matrix calculations includes integer data derived from a present movement from a center position and a sum of prior center position movements.

10. A video display apparatus, comprising:

a controllable source of a plurality of beams for producing an image on a display screen;

a photo sensor responsive to a light produced by said image for generating a fight sensing output signal;

a source of a centering signal; and a processor responsive to said light sensing output signal for performing, when selected, an automatic image distortion correction operation to store a first plurality of correction values in a memory, said processor being further responsive to said centering signal and to said stored first plurality of correction values for producing a second plurality of correction values that are applied to said controllable source of said plurality of beams to provide an image centering change of said image, in accordance with said centering signal, such that said stored first plurality of correction values that are used each time for producing said second plurality of correction values are unmodified by any intervening image centering change.

11. The display apparatus of claim 10, wherein said first plurality of correction values are derived from a matrix calculation of sensor offset values indicative of differences between initial sensor position data and updated sensor position data.

12. The display apparatus of claim 10, wherein said second plurality of correction values are derived from a 3×3 matrix calculation based on said first correction values and an updated center positional value taking into account prior center position offsets.

13. The display apparatus of claim 10, wherein said first plurality and second plurality of correction values are integers, said first plurality and second plurality being derived, respectively, from a first set and second set of 3×3 matrix calculations of convergence data, and wherein said first set and second set of matrix calculations utilize the same values except for a center matrix value corresponding to a center offset associated with a center position of the display screen.

14. The display apparatus of claim 13, wherein said center value of said second set of matrix calculations includes integer data derived from a present movement from a center position and a sum of prior center position movements.

15. A method for center convergence correction in a projection display apparatus having a plurality of light sources for producing an image on a display screen, with which a number of photo sensors are associated that can be illuminated by a marker, said method comprising:

determining a first set of correction values associated with a first set of photo sensor initial positional data, an updated set of photo sensor positional data, and a center move variable for storage in memory;

in response to light source selection and illumination of photo sensor indicative of movement of a centering signal for providing an adjustment of said image position on said display, determining a second set of correction values based on said first set of correction values, a present movement from a center position associated with said centering signal, and taking into account a history of previous movements from a center position on said display screen; and applying said correction values to said centering signal to provide an image centering change of said image, wherein for all subsequent adjustments of said image center, said first set of correction values are unmodified by any intervening updating image centering change.

16. The method of claim 15, wherein said step of determining said second set of correction values comprises determining a matrix of values, said matrix having a center value derived from integer data associated with the present movement from the center position and the center move history.

17. The method of claim 16, wherein said step of determining said second set of correction values further comprises determining said matrix of values as a 3×3 matrix, wherein said center value is the aggregate of the average of the left and right sensor vertical position differences and the top and bottom sensor horizontal position differences, a summation of previous center move distances, and the present movement from the center position.

18. The method of claim 17, wherein at least one of said other matrix values associated with edge sensor data is non-zero.

19. The method of claim 17, wherein a multiplicity of image centering operations have a progressive effect on said image center position without affecting said edge image sensor locations on said display screen.

20. The method of claim 18, wherein the center move history is updated for use in subsequent convergence corrections by summing the present center movement with the prior move history sum value and storing said sum in memory.

* * * * *